United States Patent [19]

Cottrell, Jr. et al.

[11] 4,258,106

[45] Mar. 24, 1981

[54] METHOD OF OBTAINING INTERFACE ADHESION AND ARTICLES PRODUCED THEREBY

[75] Inventors: Walter D. Cottrell, Jr., Newark; Ralph B. Jutte, Jr., Granville, both of Ohio

[73] Assignee: Owens-Corning Fiberglas Corporation, Toledo, Ohio

[21] Appl. No.: 19,209

[22] Filed: Mar. 9, 1979

Related U.S. Application Data

[60] Division of Ser. No. 710,979, Aug. 2, 1976, Pat. No. 4,144,305, which is a continuation of Ser. No. 558,405, Mar. 14, 1975, abandoned.

[51] Int. Cl.$^3$ .................... B32B 27/06; B32B 27/36
[52] U.S. Cl. ..................... 428/482; 428/480; 428/483; 264/255; 156/245
[58] Field of Search ............ 428/480, 482, 483; 264/247, 251, 254, 255; 156/245

[56] References Cited

U.S. PATENT DOCUMENTS

| | | | |
|---|---|---|---|
| 3,272,645 | 9/1966 | Duhoo et al. | 428/482 |
| 3,784,664 | 1/1974 | Nicklin | 264/246 |
| 3,801,693 | 4/1974 | Stallings et al. | 264/331 |
| 3,812,074 | 5/1974 | Oswitch et al. | 264/255 |

*Primary Examiner*—George F. Lesmes
*Assistant Examiner*—E. Rollins Buffalow
*Attorney, Agent, or Firm*—Ronald C. Hudgens; Philip R. Cloutier; James B. Wilkens

[57] ABSTRACT

The present invention relates to the method of producing an interface that intimately bonds to common molding compounds; even though they contain mold release agents. The method utilizes a material at the surface of the molded part that bonds to the surface of the part but not to the steel mold. This not only permits the molding of an article using common industry techniques but more importantly the subsequent postmolding of a pigmented or protective resinous coating on one surface of a molded article. The method eliminates the need for special surface preparation such as sand blasting, scuff sanding, etc., to facilitate bonding of a secondary coating.

9 Claims, No Drawings

METHOD OF OBTAINING INTERFACE ADHESION AND ARTICLES PRODUCED THEREBY

This is a division of application Ser. No. 710,979 filed Aug. 2, 1976 now U.S. Pat. No. 4,144,305, which was a continuation of Ser. No. 558,405 filed on Mar. 14, 1975, now abandoned.

BACKGROUND OF THE INVENTION

The molding compounds with which we are concerned utilize a crosslinking thermosetting polymer as a matrix material and may include fillers and/or fibers to strengthen and/or cheapen the product. The molding compounds usually include an activating catalyst for the crosslinking process, and a mold release agent which prevents these materials from bonding to the metal dies used in the molding process. Great economy is achieved by reason of the simultaneous shaping and curing of the molding compounds to a thermoset condition. Molding compounds are dependent, however, upon the presence of a mold release agent to prevent the crosslinking of the molding compound from adhering to the surfaces of the forming molds. The precise mechanism by which mold release agents operate is not known. One theory which has been held heretofore is that there is a migration during cure of the mold release agent to the heated surface of the mold to create a non-adhering film on the surface of the molded part produced. Whether or not this theory is correct, has to the writer's knowledge, never been settled. It is axiomatic, however, that without the presence of the mold release agent, molding compounds stick tenaciously to the surface of untreated molds, and that with the mold release agent present, they do not stick to the surfaces of untreated molds. It is not always feasible to put lubricant on the surface of molds between the times that each part is made, so that molding compounds which are used for commercial production usually include a mold release agent, usually a salt of a fatty acid.

Certain problems exist with parts that are molded from compounds that contain mold release agents in that paints and/or subsequent pigmented resinous surfacing layers cannot be bonded thereto without the removal of the film of mold release agent that exists on the molded part. Removal of the film of mold release agent is usually done by sand blasting, sanding, scraping, etc.. A method used to produce colored parts without this removal step has been to incorporate pigment in the molding compound. The incorporation of the pigment in the molding compound, however, is wasteful of the pigment. Production of different pigmented molding compound is also more tedious.

An object of the present invention is the provision of a new and improved process whereby molding compounds containing mold release agents can be molded, and a highly pigmented coating applied thereto, without any additional preparation of the surface of the molded part before the coating is applied.

Another object of the invention is the provision of a new and improved process of the above-described type wherein the coating can be applied in the same set of dies in which the main body portion was molded.

Another object of the present invention is the provision of a new and improved method of bonding two separate layers of molding compounds even though they contain mold release agents.

Further objects and advantages of the invention will become apparent to those skilled in the art to which the invention relates from the following description of the preferred embodiments.

DESCRIPTION OF THE PREFERRED EMBODIMENTS

According to principles of the present invention, it has been discovered that it is possible to adhere a thin sheet of particular kinds of thermoplastic materials having certain particular properties to molding compounds even though they contain mold release agents. It has been discovered that the thermoplastic material must be dissolvable at molding temperatures by the solvents and particularly the crosslinking monomers that are used in the molding compound. The layer of thermoplastic material need be only a few mils thick, and surprisingly it has further been found that such a thin sheet can adhere a second body of molding compound having mold release agent therein to the first body of molding compound through the thermoplastic sheet. The resulting interfaces, of course, cannot be precisely analyzed. However, the strong bonding of applicants' thermoplastic sheets to the molding compounds seems to indicate that the molecules of monomers have in fact been utilized to adhere or bond the thermoplastic sheet to the crosslinked body of molding compound.

EXAMPLE 1

A polyester resin was made from the following materials in parts by weight:

| Materials | Parts By Weight |
| --- | --- |
| Propylene glycol | 578.2 |
| Maleic anhydride | 674.4 |
| Toluhydroquinone (25% solution in styrene) | 4.8 |

The polyester was made by charging all the propylene glycol, one third of the maleic anhydride and 1.6 grams of toluhydroquinone into a reactor using a continuous nitrogen sparge. The temperature was raised to 190° F., and after about 4 hours, the acid number was 35. Thereafter the remainder of the maleic anhydride was added at the rate of 100 to 150 parts per minute to control the temperature at 300° F. Thereafter the temperature of the ingredients was held at 310° to 320° F. for 60 minutes, following which the temperature was increased to 400° F. The material had an acid number of 29 to 32 and a sample cut 2 to 1 in styrene had a Saybold viscosity of 21 to 25 seconds at 350° F. Thereafter the contents were cooled to 340° F. The polyester prepolymer when cut with styrene in a 90 to 10 ratio was stable at 120° C. for 30 minutes before gelling.

In another tank 486.4 parts of styrene, 2.0 parts of MEHQ (methyl ether of hydroquinone) are mixed and held at a temperature between 130° to 145° F. Thereafter 1,138 parts of the polyester resin prepolymer produced as above described and at a temperature of 330° to 355° F. was added with agitation to provide a thinned polyester syrup which was then cooled to a temperature of 180° F. The viscosity of the thinned polyester syrup was 1,500 to 2,000 Brookfield cps and had a water content of 0.08 and a monomer content within the range of 30 to 34% by weight.

A resin-filler paste is made of the following materials:

| Materials | Desirable % By Wt. | Preferred % By Wt. |
|---|---|---|
| RESIN HAVING CROSSLINKABLE OLEFINIC DOUBLE BONDS | 25-95 | |
| Unsaturated resin syrup described above | | 42.7 |
| CATALYST FOR CROSSLINKING DOUBLE BONDS | 0.1-5 | |
| Dicumyl peroxide | | 0.85 |
| 2,5 - dimethyl hexyl-2,5-di (peroxybenzoate) | | 0.09 |
| HOLD RELEASE AGENT | 0-5 | |
| Zinc Stearate | | 1.71 |
| GELLING AGENT (Alkaline Earth Metal Oxide) | 0.2-10 | |
| Ca(OH)$_2$ | | 1.28 |
| SOLVENT | Optional | |
| Styrene monomer | | 4.27 |
| FILLERS | 0-75 | |
| Resin type (microethylene) | | 6.4 |
| Nonresinous filler (CaCO$_3$) | | 43.7 |

The following mix procedure is used to make the resin-filler paste. The resin-filler paste is prepared by charging the resin to a Cowles type mixture. The 2,5-dimethyl hexyl-2,5-di (peroxybenzoate) dissolved in approximately half of the styrene is blended with the resin. Thereafter, the dicumyl peroxide and mold release agent are added. The resin type filler is then blended in, following which the nonresinous filler is likewise added and thoroughly dispersed. Immediately before the resin-filler paste is to be used, a slurry of the gelling agent in the other half of the styrene is added and mixed for approximately three minutes.

After aging for one week, a molded part approximately 0.100 inch thick was made using a male and female steel die set which was heated to 300° F. The female mold had a flat cavity 12"×18" by 1" deep. Sufficient of the above molding compound was placed in the mold cavity to form a part 0.090 inch thick. A methylmethacrylate sheet 2 mils thick was placed on top of the molding compound, and the male die was brought down into engagement therewith with a force of 1,000 lbs. per square inch, and was held at this pressure and temperature for 90 seconds. Thereafter the male die was raised to separate from the composite, and sufficient colored polyester molding compound was placed on top of the methylmethacrylate layer to form an additional thickness of 0.008 inch. The colored molding compound was obtained by mixing 1% by weight of carbon black with the molding compound described above. The male die was then brought down against the colored polyester layer with a force of 1,000 lbs. per square inch and this force was again held for 30 seconds. The male die was then raised and the composite removed from the mold and cooled. The top black layer could not be peeled from the base layer without destroying the composite.

EXAMPLE 2

The process of Example 1 was repeated excepting that the polymethacrylate film was replaced with a sheet of polystyrene. The composite so produced had substantially the same properties as did the composite of Example 1.

EXAMPLE 3

The process of Example 1 was repeated excepting that the polymethacrylate film was replaced with a sheet of polyvinylacetate. This composite so produced had substantially the same properties as the composite of Example 1.

EXAMPLE 4

The process of Example 1 was repeated excepting that a commercial colored gel coat having a catalyst, a thickening agent, and zinc stearate mold release agent added thereto was used in place of the colored polyester layer. The gel coat is tightly bonded to the base layer through the thermoplastic sheet.

EXAMPLE 5

A sheet molding compound is made using the resin filler paste, a carrier film of polyethylene and another carrier film of polyethylmethacrylate. These materials are processed according to the procedure taught in Davis, et al U.S. Pat. No. 3,615,979, and is stored to produce the sheet molding compound. This sheet molding compound can be used in the molding procedure of Example 1 by removing the polyethylene carrier film, and substituting the remainder of the sheet molding compound for the molding compound and thermoplastic sheet of Example 1.

EXAMPLE 6

A molded article in which a highly pigmented and/or filled layer having one rate of cure shrinkage can be bonded to a thermoset resin preferably reinforced with glass fibers and having a different cure shrinkage rate by means of the present invention. For example, the gel coat of Example 4 is applied to the polyethylmethacrylate carrier film of the sheet molding compound of Example 5. The gel coat is allowed to thicken to a non-running condition, the polyethylene carrier film is removed from the sheet molding compound and the resulting sandwich is then placed in the mold and cured according to the procedure of Example 1. The gel coat is tightly bonded to the glass fiber reinforced base layer through the intermediary of the thermoplastic sheet in a manner accommodating the differences in cure shrinkage of the gel coat and base layers.

The following thermoplastics which are softened by and permeable to styrene are the preferred thermoplastics for the bonding function of the present invention: polystyrene, substituted polystyrene, polyalkylacrylates, substituted polyalkylacrylates, polyvinylacetate and substituted polyvinylacetate.

It will now be seen that sheets of thermoplastic material which are softenable by and permeable to the crosslinking solvents under the conditions of heat, etc. which exist in the molding operation can be used. Styrene is a preferred solvent since it is believed to permeate the plastic sheet and then polymerize in situ and crosslink with the polyester resin layers. When desired, parts can be made with a single molding operation by placing the sheet of thermoplastic material between two layers of sheet molding compound to form an uncured sandwich. Thereafter the sandwich can be compressed by the heated mold surface to cure and bond the two layers of molding compound through the thermoplastic layer.

While the invention has been described in considerable detail, we do not wish to be limited to the particular embodiments shown and described, and it is our intention to cover hereby all novel adaptations, modifications, and arrangements thereof which come within the practice of those skilled in the art to which the invention relates.

We claim:

1. A composite comprising: first and second layers of thermoset materials crosslinked by in situ reacted monomer, with at least said first layer containing a mold release agent, and a sheet of thermoplastic material containing in situ polymerized monomer and mold release agent absorbed from said layers of thermoset materials sandwiched between and bonded to said first and second layers of thermoset material.

2. The composite of claim 1 wherein said thermoplastic material is a polystyrene, substituted polystyrene, polyacrylate, substituted polyacrylate, polyvinylacetate or a substituted polyvinylacetate base material.

3. The composite of claim 2 wherein said thermoset materials are polyester base materials.

4. The composite of claim 3 wherein said mold release agent is a salt of a fatty acid.

5. The composite of claim 4 wherein said first layer of thermoset material is glass fiber reinforced, and wherein said second layer is a highly pigmented surfacing layer.

6. The composite of claim 5 wherein said second layer is a gel coat.

7. A composite comprising: a sheet of a thermoplastic polymer that is softenable and permeable by styrene, a first layer of a highly filled and pigmented polyester resin on one surface of said sheet, and a second layer of polyester resin containing glass fiber reinforcement on the other surface of said sheet, said layers being crosslinked and bonded to said sheet by the in situ polymerization of styrene, at least one of said layers containing a mold release agent and said sheet containing mold release agent absorbed from said layers.

8. A colored article comprising: a sheet of thermoplastic material that is softenable and permeable by styrene, a first layer of crosslinked polyester that is reinforced by glass fibers on one surface of the sheet, and a second layer of a highly filled, pigmented and crosslinked polyester on the other surface of said sheet, said polyester layers being bonded to said thermoplastic sheet by polystyrene chains which permeate said thermoplastic sheet, at least one of said layers containing a mold release agent and said sheet containing mold release agent absorbed from said layers.

9. The colored article of claim 8 wherein said filled and pigmented layer is a gel coat.

* * * * *